United States Patent
Wang

(10) Patent No.: US 9,973,427 B2
(45) Date of Patent: *May 15, 2018

(54) METHOD FOR DETERMINING MANAGEMENT DOMAIN, NETWORK DEVICE, AND VIRTUAL CLUSTER

(71) Applicant: Huawei Technologies Co., Ltd., Shenzhen, Guangdong (CN)

(72) Inventor: Jun Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/623,288

(22) Filed: Jun. 14, 2017

(65) Prior Publication Data
US 2017/0289035 A1    Oct. 5, 2017

Related U.S. Application Data

(63) Continuation of application No. 14/741,226, filed on Jun. 16, 2015, now Pat. No. 9,699,080, which is a continuation of application No. PCT/CN2012/086818, filed on Dec. 18, 2012.

(51) Int. Cl.
| | |
|---|---|
| *H04L 12/28* | (2006.01) |
| *H04L 12/741* | (2013.01) |
| *H04L 12/46* | (2006.01) |
| *H04L 12/751* | (2013.01) |

(Continued)

(52) U.S. Cl.
CPC .......... *H04L 45/74* (2013.01); *H04L 12/4641* (2013.01); *H04L 41/0806* (2013.01); *H04L 41/0886* (2013.01); *H04L 41/0893* (2013.01); *H04L 41/12* (2013.01); *H04L 45/02* (2013.01); *H04L 45/46* (2013.01)

(58) Field of Classification Search
CPC ..... H04L 45/74; H04L 41/0806; H04L 45/46; H04L 41/12; H04L 61/2007; H04L 12/4641; H04L 45/02; H04L 41/0893; H04L 41/0886
USPC ........................................................ 370/392
See application file for complete search history.

(56) References Cited

U.S. PATENT DOCUMENTS

| | | |
|---|---|---|
| 7,991,859 B1 | 8/2011 | Miller et al. |
| 2002/0156883 A1 | 10/2002 | Natarajan et al. |

(Continued)

FOREIGN PATENT DOCUMENTS

| | | |
|---|---|---|
| CN | 1561042 A | 1/2005 |
| CN | 1735034 A | 2/2006 |

(Continued)

*Primary Examiner* — Faisal Choudhury

(57) ABSTRACT

A method for determining a management domain, the method comprising: receiving, by a second network device, a first packet sent by a first network device, where the first packet includes a domain ID of a first management domain and a first IP address set corresponding to the domain ID of the first management domain, and the first IP address set includes an IP address of a network device in the first management domain; and when the second network device determines that the first IP address set includes an IP address of the second network device, determining that the second network device belongs to the first management domain, and storing the domain ID of the first management domain.

14 Claims, 12 Drawing Sheets

(51) Int. Cl.
*H04L 12/24* (2006.01)
*H04L 12/715* (2013.01)

(56) References Cited

U.S. PATENT DOCUMENTS

| | | | |
|---|---|---|---|
| 2004/0233916 A1* | 11/2004 | Takeuchi | H04L 29/12066 370/395.54 |
| 2005/0111494 A1 | 5/2005 | Kecskemeti | |
| 2006/0248371 A1 | 11/2006 | Chen et al. | |
| 2008/0084888 A1* | 4/2008 | Yadav | H04L 45/02 370/395.31 |
| 2009/0245242 A1 | 10/2009 | Carlson et al. | |
| 2009/0316602 A1 | 12/2009 | Nandy et al. | |
| 2009/0323659 A1* | 12/2009 | Zhang | H04W 76/023 370/338 |
| 2010/0278076 A1 | 11/2010 | Reddy et al. | |
| 2012/0044862 A1 | 2/2012 | Chen | |
| 2012/0271926 A1 | 10/2012 | Shakirzyanov et al. | |
| 2012/0302229 A1 | 11/2012 | Ronneke | |
| 2012/0307825 A1 | 12/2012 | Hui et al. | |
| 2013/0086665 A1* | 4/2013 | Filippi | H04L 63/0272 726/7 |

FOREIGN PATENT DOCUMENTS

| | | |
|---|---|---|
| CN | 101599893 A | 12/2009 |
| CN | 101771692 A | 7/2010 |
| CN | 101997703 A | 3/2011 |
| CN | 102355369 A | 2/2012 |

* cited by examiner

METHOD FOR DETERMINING MANAGEMENT DOMAIN, NETWORK DEVICE, AND VIRTUAL CLUSTER

CROSS-REFERENCE TO RELATED APPLICATIONS

This application is a continuation of U.S. patent application Ser. No. 14/741,226, filed on Jun. 16, 2015, which is a continuation of International Application No. PCT/CN2012/086818, filed on Dec. 18, 2012. All of aforementioned patent applications are hereby incorporated by reference in their entireties.

TECHNICAL FIELD

The present invention relates to the field of communications technologies, and in particular, to a method for determining a management domain, a network device, and a virtual cluster.

BACKGROUND

With the rapid development of an Internet Protocol (IP) network, a capacity and the number of users of an IP bearer network increase continuously and rapidly, leading to a greater demand for network bandwidth. To deal with the rapidly increasing demand for network bandwidth, a virtual cluster technology appears. The virtual cluster technology is virtualizing multiple network devices as a whole, and the multiple network devices are externally presented as one network device. A user may manage a cluster device on a management device of a virtual cluster, for example, perform configuration, install a patch, set a Product Adapter File (PAF), or set a license (license).

A management device in a virtual cluster is referred to as a main device, and a managed device is referred to an Access Point (AP). When an IP address is configured for each network device in the virtual cluster, data communication between the main device and the AP is performed by establishing a traffic engineering tunnel (Traffic Engineering Tunnel, TE Tunnel).

In actual networking, there may be a large number of network devices in a virtual cluster, and therefore, it may occur that multiple management devices manage the entire virtual cluster simultaneously, and each management device needs to save topology information in the entire virtual cluster. To achieve that each management device in the virtual cluster saves topology information of network devices in the entire virtual cluster, the prior art uses the following technical solution.

First, the network devices in the virtual cluster are categorized into multiple management domains in a manual configuration manner, where each management domain includes one management device, and the management device in each management domain manages other network devices in the management domain to which the management device belongs. The management device in each management domain collects topology information of network devices in the management domain, and topology information synchronization is performed among management devices of different management domains in the virtual cluster, thereby achieving that each management device in the virtual cluster saves topology information of the network devices in the entire virtual cluster. By performing topology information synchronization among network devices in each management domain, the management device in each management domain can obtain topology information of the network devices in the management domain to which the management device belongs. In the foregoing technical solution, before topology information synchronization is performed among the network devices of each management domain, domain information needs to be manually preconfigured on each network device, and a neighbor relationship needs to be established. For example, if topology information synchronization needs to be performed between two network devices in a management domain in a virtual cluster, domain information needs to be configured on the two network devices first, and by using an example that obtaining domains by means of division is achieved by using an Intermediate System to Intermediate System (Intermediate System to Intermediate System, IS-IS), the following configuration needs to be performed on the two network devices separately:

isis 1;
is-level level-1; and
network-entity 10.0000.0000.0001.00.

Then, after an IS-IS neighbor relationship is established between the two devices, topology information of the two devices is synchronized with each other. Because domain information needs to be manually configured on each network device, and a neighbor relationship needs to be established, difficulty in maintaining a virtual cluster is increased, which is adverse to the development of the virtual cluster technology.

SUMMARY

Embodiments of the present invention provide a method for determining a management domain, a network device and a virtual cluster, which prevent a problem of maintenance difficulty in the prior art caused by that when a virtual cluster is divided into management domains, to determine a management domain to which each network device belongs, management domain information needs to be manually configured on each network device in the virtual cluster separately.

According to a first aspect, a method for determining a management domain is provided, where the method is applicable to a virtual cluster, the virtual cluster includes a first network device and a second network device, the virtual cluster includes at least two management domains, the first network device manages a first management domain, and the method includes:

receiving, by the second network device, a first packet sent by the first network device, where the first packet includes a domain identifier (ID) of the first management domain and a first Internet Protocol (IP) address set corresponding to the domain ID of the first management domain, and the first IP address set includes an IP address of a network device in the first management domain; and when the second network device determines that the first IP address set includes an IP address of the second network device, determining that the second network device belongs to the first management domain, and storing the domain ID of the first management domain.

In a first possible implementation manner of the first aspect, the first network device further manages a second management domain, the first packet further includes a domain ID of the second management domain and a second IP address set corresponding to the domain ID of the second management domain, the second IP address set includes an IP address of a network device in the second management domain, and the method further includes:

when the second network device determines that the second IP address set includes the IP address of the second network device, determining that the second network device belongs to the second management domain, and storing the domain ID of the second management domain.

According to the first aspect or the first possible implementation manner of the first aspect, a second possible implementation manner of the first aspect is further provided, and in the second possible implementation manner of the first aspect, after the second network device determines that the second network device belongs to the first management domain, the method further includes:

sending, by the second network device, a second packet to a network device corresponding to a first IP address, where the second packet includes topology information of the second network device, the first IP address is any IP address in the first IP address set, and the first IP address is different from the IP address of the second network device.

According to the first aspect or either of the foregoing possible implementation manners of the first aspect, a third possible implementation manner of the first aspect is further provided, and in the third possible implementation manner of the first aspect, the virtual cluster further includes a third network device, and the method further includes:

receiving, by the second network device, a third packet sent by the third network device, where the third packet includes a domain ID of a third management domain to which the third network device belongs, an IP address of a management device in the third management domain, and topology information of the third network device; and when it is determined that the domain ID of the third management domain is the same as a domain ID of a management domain to which the second network device belongs, and when the IP address of the management device in the third management domain is the same as an IP address of the first network device, storing the topology information of the third network device.

According to the first aspect or any one of the foregoing possible implementation manners of the first aspect, a fourth possible implementation manner of the first aspect is further provided, the first packet is a Link State Update (LSU) packet, and a first Type-Length-Value (TLV) is added to an opaque link-state advertise (Opaque LSA) of the LSU packet to carry the domain ID of the first management domain and the first IP address set, or, the first packet may be a link state protocol data unit (Link State Protocol Data Unit, LSP), and a second TLV is added to the LSP to carry the domain ID of the first management domain and the first IP address set.

According to a second aspect, a method for determining a management domain is provided, where the method is applicable to a virtual cluster, the virtual cluster includes a first network device and a second network device, the virtual cluster includes at least two management domains, the first network device manages a first management domain, and the method includes:

constructing, by the first network device, a first packet, where the first packet includes a domain ID of the first management domain and a first IP address set corresponding to the domain ID of the first management domain, and the first IP address set includes an IP address of a network device in the first management domain; and sending, by the first network device, the first packet to the second network device, so that after receiving the first packet, the second network device determines whether the first IP address set includes an IP address of the second network device, and when the first IP address set includes the IP address of the second network device, determines that the second network device belongs to the first management domain, and stores the domain ID of the first management domain.

In a first possible implementation manner of the second aspect, the first network management device further manages a second management domain, and the first packet further includes a domain ID of the second management domain and a second IP address set corresponding to the domain ID of the second management domain, so that after receiving the first packet, and when determining that the second IP address set includes the IP address of the second network device, the second network device determines that the second network device belongs to the second management domain, and stores the domain ID of the second management domain.

According to the second aspect or the first possible implementation manner of the second aspect, a second possible implementation manner of the second aspect is further provided, and in the second possible implementation manner of the second aspect, the method further includes:

receiving, by the first network device, a second packet sent by the second network device, where the second packet includes topology information of the second network device, and the second packet is sent by the second network device when determining that the second network device belongs to a management domain managed by the first network device.

According to a third aspect, a second network device is provided, where the second network device is a network device in a virtual cluster, the virtual cluster includes a first network device and the second network device, the virtual cluster includes at least two management domains, the first network device manages a first management domain, and the second network device includes:

a receiving unit, configured to receive a first packet sent by the first network device, where the first packet includes a domain ID of the first management domain and a first IP address set corresponding to the domain ID of the first management domain, and the first IP address set includes an IP address of a network device in the first management domain;

a judging unit, configured to determine whether the first IP address set that is included in the first packet received by the receiving unit includes an IP address of the second network device;

a determining unit, configured to: when the judging unit determines that the first IP address set includes the IP address of the second network device, determine that the second network device belongs to the first management domain; and a storage unit, configured to store the domain ID of the first management domain when the determining unit determines that the second network device belongs to the first management domain.

In a first possible implementation manner of the third aspect, the first network management device further manages a second management domain, the first packet further includes a domain ID of the second management domain and a second IP address set corresponding to the domain ID of the second management domain, and the second IP address set includes an IP address of a network device in the second management domain;
  the judging unit is further configured to determine whether the second IP address set includes the IP address of the second network device;
  the determining unit is further configured to: when the judging unit determines that the second IP address set includes the IP address of the second network device, determine that the second network device belongs to the second management domain; and
  the storage unit is further configured to store the domain ID of the second management domain when the determining unit determines that the second network device belongs to the second management domain.

According to the third aspect or the first possible implementation manner of the third aspect, a second possible implementation manner of the third aspect is further provided, and in the second possible implementation manner of the third aspect, the second network device further includes:
  a sending unit, configured to: after the determining unit determines that the second network device belongs to the first management domain, send a second packet to a network device corresponding to a first IP address, where the second packet includes topology information of the second network device, the first IP address is any IP address in the first IP address set, and the first IP address is different from the IP address of the second network device.

According to the third aspect or either of the foregoing possible implementation manners of the third aspect, a third possible implementation manner of the third aspect is further provided, and in the third possible implementation manner of the third aspect, the virtual cluster further includes a third network device;
  the receiving unit is further configured to receive a third packet sent by the third network device, where the third packet includes a domain ID of a third management domain to which the third network device belongs, an IP address of a management device in the third management domain, and topology information of the third network device;
  the judging unit is further configured to determine whether the domain ID of the third management domain is the same as a domain ID that is stored by the storage unit and is of a management domain to which the second network device belongs, and determine whether the IP address of the management device in the third management domain is the same as an IP address of the first network device; and
  the storage unit is further configured to: when the judging unit determines that the domain ID of the third management domain is the same as the domain ID that is stored by the storage unit and is of the management domain to which the second network device belongs, and when the IP address of the management device in the third management domain is the same as the IP address of the first network device, store the topology information of the third network device.

According to a fourth aspect, a first network device is provided, where the first network device is a network device in a virtual cluster, the virtual cluster includes the first network device and a second network device, the virtual cluster includes at least two management domains, the first network device manages a first management domain, and the first network device includes:

a constructing unit, configured to construct a first packet, where the first packet includes a domain ID of the first management domain and a first IP address set corresponding to the domain ID of the first management domain, and the first IP address set includes an IP address of a network device in the first management domain; and
  a sending unit, configured to send the first packet constructed by the constructing unit to the second network device, so that after receiving the first packet, and when determining that the first IP address set includes an IP address of the second network device, the second network device determines that the second network device belongs to the first management domain, and stores the domain ID of the first management domain.

In the first possible implementation manner of the fourth aspect, the first network device further includes:
  a receiving unit, configured to receive a second packet sent by the second network device, where the second packet includes topology information of the second network device, and the second packet is sent by the second network device when determining that the second network device belongs to a management domain managed by the first network device.

According to a fifth aspect, a virtual cluster is provided, where the virtual cluster includes at least two management domains, and the first network device manages a first management domain, where
  the first network device is configured to construct a first packet, and send the first packet to the second network device, where the first packet includes a domain ID of the first management domain and a first IP address set corresponding to the domain ID of the first management domain, and the first IP address set includes an IP address of a network device in the first management domain; and
  the second network device is configured to receive the first packet, and when determining that the first IP address set includes an IP address of the second network device, determine that the second network device belongs to the first management domain, and store the domain ID of the first management domain.

In a possible implementation manner of the fifth aspect, the first packet is a link state update LSU packet, and a first type-length-value TLV is added to an opaque link state advertise Opaque LSA of the LSU packet to carry the domain ID of the first management domain and the first IP address set, or,
  the first packet may be a link state protocol data unit LSP, and a second TLV is added to the LSP to carry the domain ID of the first management domain and the first IP address set.

In summary, by using a technical solution provided in the embodiments of the present invention, a first network device sends a first packet to a second network device, where the first packet includes a domain identifier ID of a first management domain and a first IP address set corresponding to the domain ID of the first management domain, and after receiving the first packet, and when determining that a IP address set includes an IP address of the second network device, the second network device determines that the second network device belongs to the first management domain. By using this solution, because management domain information does not need to be manually configured on the second network device, a management domain to which each network device belongs can be determined conveniently, thereby reducing difficulty in maintaining a virtual cluster.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
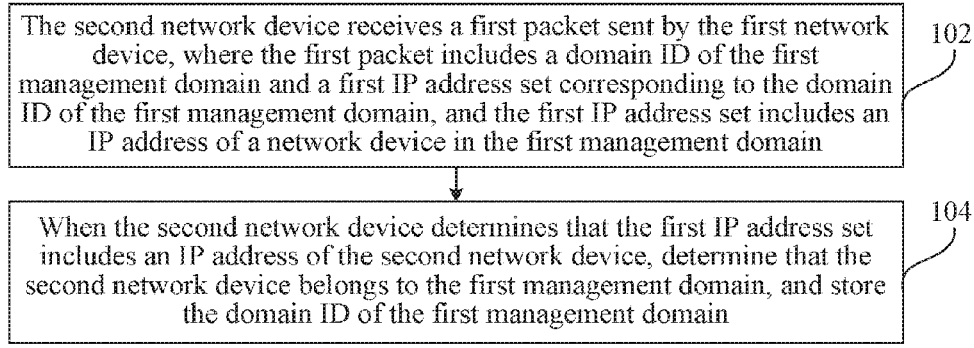
FIG. 1 is a schematic flowchart of a method for determining a management domain according to an embodiment of the present invention.

Referring to FIG. 1, an embodiment of the present invention provides a method for determining a management domain, where the method is applicable to a virtual cluster, the virtual cluster includes a first network device and a second network device, the virtual cluster includes at least two management domains, the first network device manages a first management domain, and the method includes the following content:

102: The second network device receives a first packet sent by the first network device, where the first packet includes a domain ID of the first management domain and a first IP address set corresponding to the domain ID of the first management domain, and the first IP address set includes an IP address of a network device in the first management domain.

104: When the second network device determines that the first IP address set includes an IP address of the second network device, determine that the second network device belongs to the first management domain, and store the domain ID of the first management domain.

Figure 2A:
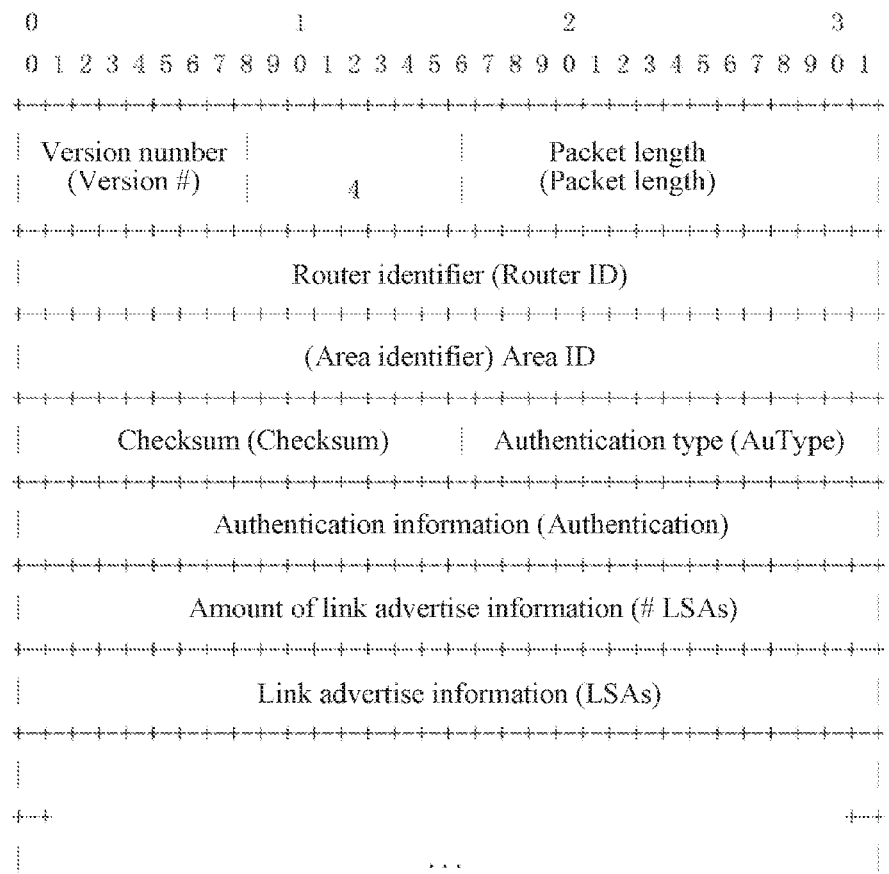
FIG. 2A is a schematic diagram of a format of an LSU packet.
Figure 2B:
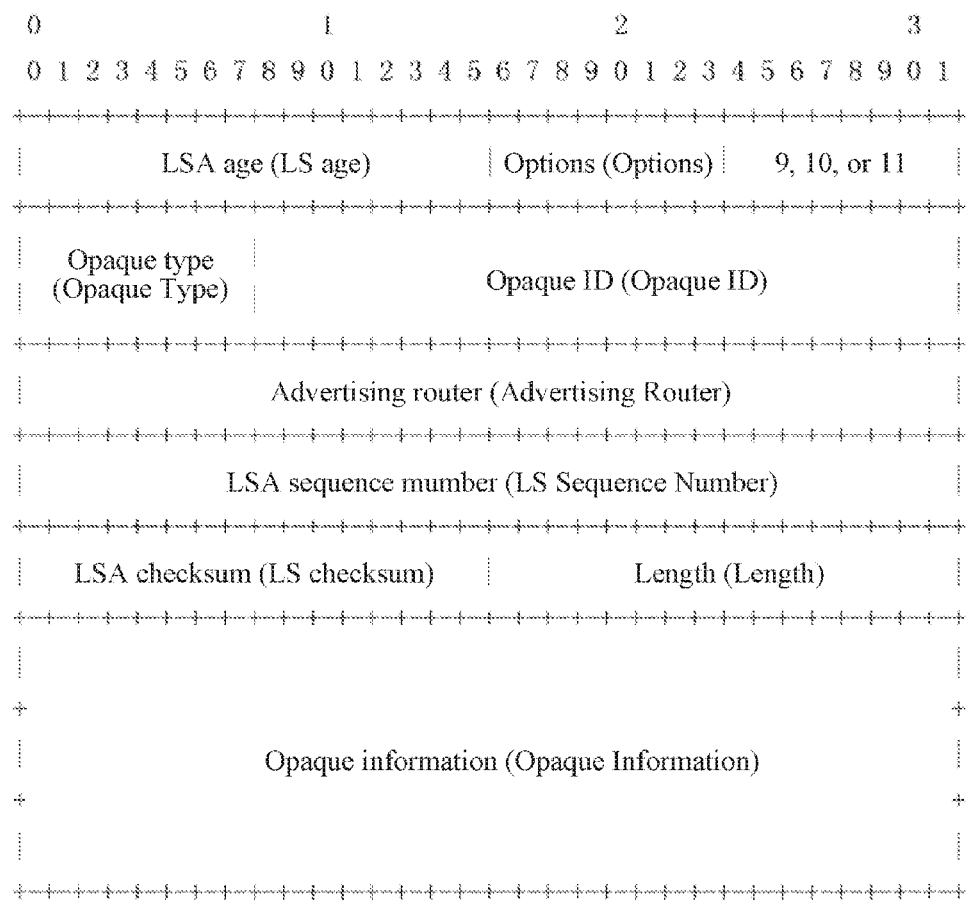
FIG. 2B is a schematic diagram of a format of an Opaque LSA.
Figure 2C:
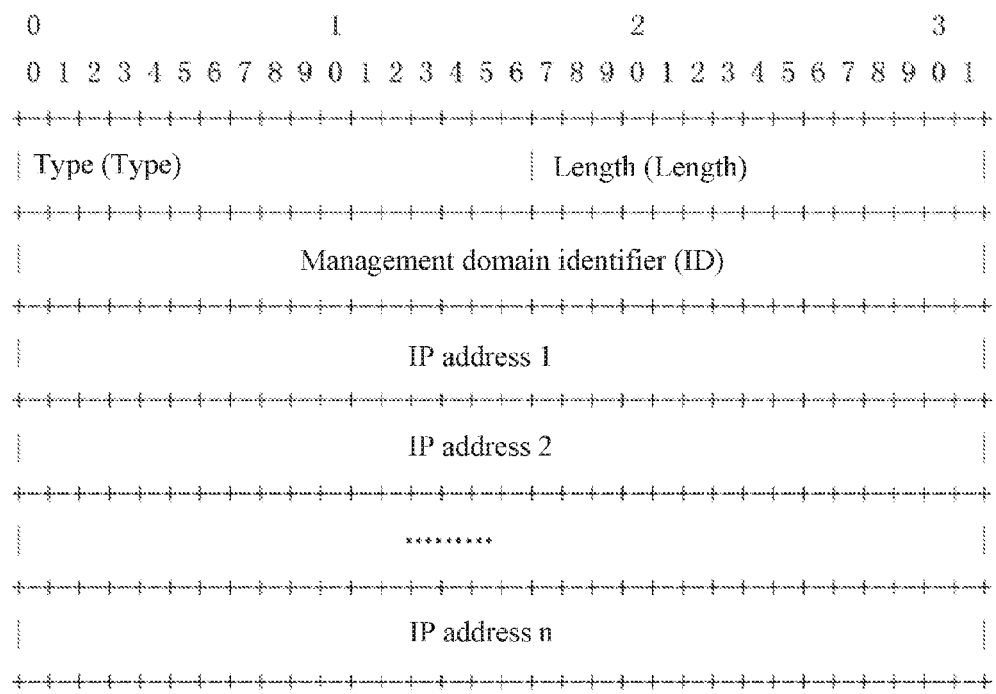
FIG. 2C is a schematic diagram of a format of a first TLV according to an embodiment of the present invention.

Optionally, the first packet may be an extended LSU packet (Link State Update packet). The RFC2328 defines an LSU packet, as shown in FIG. 2A; for descriptions of fields shown in FIG. 2A, refer to the RFC2328, and details are not described herein again. The RFC5250 defines an Opaque LSA, as shown in FIG. 2B; for descriptions of fields shown in FIG. 2B, refer to the RFC5250, and details are not described herein again. In this embodiment of the present invention, a first TLV is added to an Opaque LSA carried in the LSU packet, to carry the domain ID of the first management domain and the first IP address set. For example, an Opaque Information (Opaque Information) field in the Opaque LSA carried in the LSU packet may be extended to carry the domain ID of the first management domain and the first IP address set. The first TLV may be extended in Opaque Information field of the Opaque LSA, and a format of the first TLV is shown in FIG. 2C, where:

a Type (Type) field with a length of 2 bytes is used to identify that the first TVL carries the domain ID of the first management domain and the first IP address set, and a value is a type value different from that of a TLV in an Opaque LSA in the prior art;

a Length (Length) field with a length of 2 bytes is used to identify a total length of data content included in the first TLV;

a Management Domain Identifier (ID) field with a length of 4 bytes is used to identify the domain ID of the first management domain;

an IP Address 1 field with a length of 4 bytes is used to identify the first IP address in the first IP address set;

an IP Address 2 field with a length of 4 bytes is used to identify the second IP address in the first IP address set;

. . .

an IP Address n field with a length of 4 bytes is used to identify the $n^{th}$ IP address (n is a natural number) in the first IP address set. FIG. 2C is merely an example, and there may be one or more IP address fields.

Figure 2D:
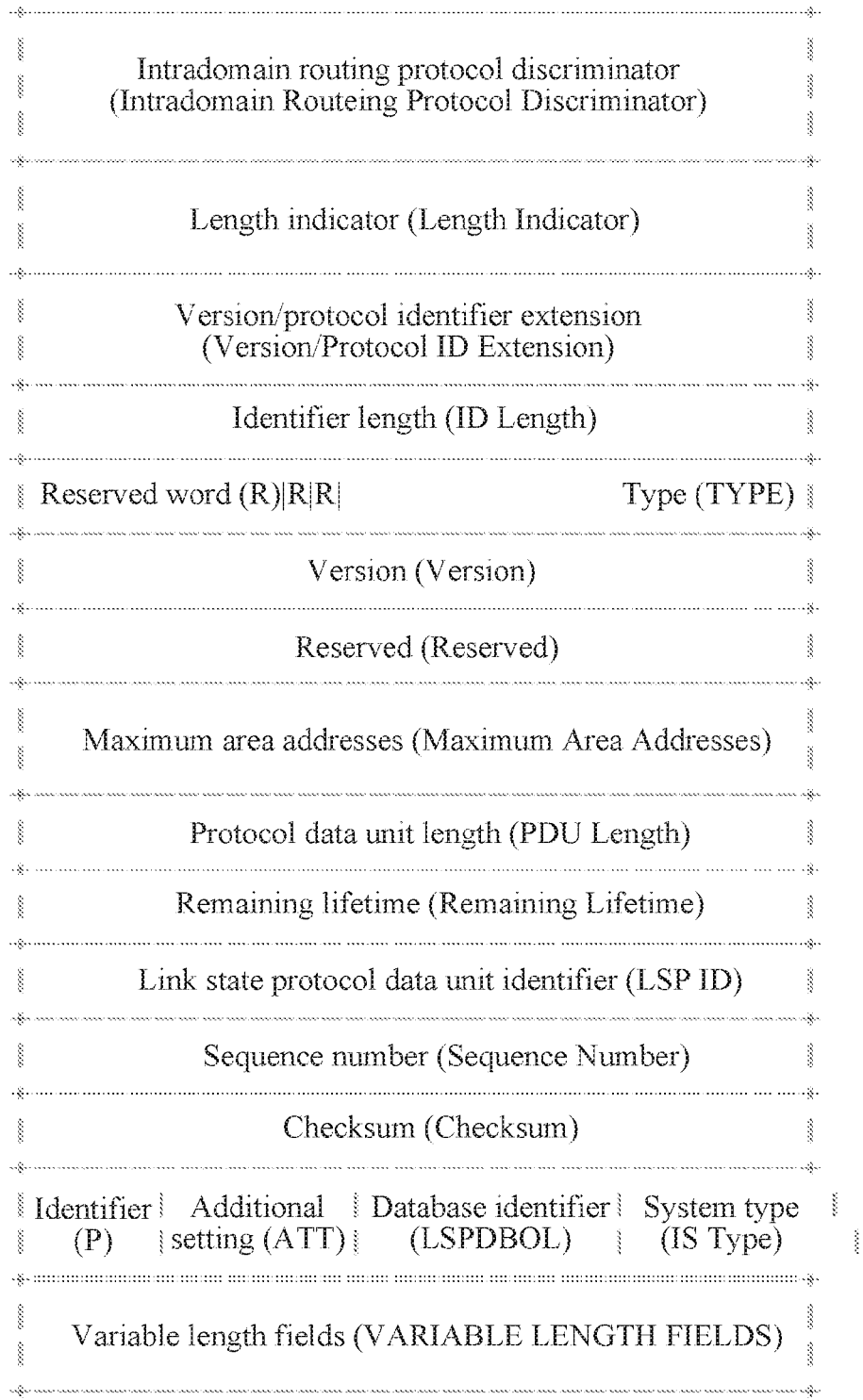
FIG. 2D is a schematic diagram of a format of an LSP.

Optionally, the first packet may be an extended link state protocol data unit (Link State Protocol Data Unit, LSP for short). The ISO/IEC10589 defines an LSP, as shown in FIG. 2D; for descriptions of fields shown in FIG. 2D, refer to the ISO/IEC10589, and details are not described herein again. In this embodiment of the present invention, a second TLV may be added to the LSP to carry the domain ID of the first management domain and the first IP address set. Variable Length Fields (Variable Length Fields) of the LSP shown in FIG. 2D is a part that can be extended by a user. For example, the Variable Length Fields of the LSP shown in FIG. 2D may be extended to carry the second TLV, where a format of the second TLV is the same as that of the first TLV. For details, refer to FIG. 2C, where:

a Type (Type) field with a length of 2 bytes is used to identify that the second TVL carries the domain ID of the first management domain and the first IP address set, and a value is a type value different from that of a TLV in an LSP in the prior art;

a Length (Length) field with a length of 2 bytes is used to identify a total length of data content included in the second TLV;

a Management Domain Identifier (ID) field with a length of 4 bytes is used to identify the domain ID of the first management domain;

an IP Address 1 field with a length of 4 bytes is used to identify the first IP address in the first IP address set;

an IP Address 2 field with a length of 4 bytes is used to identify the second IP address in the first IP address set;

an IP Address n field with a length of 4 bytes is used to identify the $n^{th}$ IP address (n is a natural number) in the first IP address set. FIG. 2C is merely an example, and there may be one or more IP address fields.

Optionally, the first IP address set is pre-configured on the first network device by a network administrator.

It can be seen that, the first network device sends the first packet to the second network device, and after receiving the first packet, and when determining that the first IP address set includes the IP address of the second network device, the second network device determines that the second network device belongs to the first management domain. By using this solution, a management domain to which the second network device belongs can be determined easily and conveniently, without the need of manually configuring management domain information on the second network device. For example, when the first network device manages multiple network devices, it is unnecessary to manually configure management domain information separately on the multiple network devices managed by the first network device, thereby simplifying configuration of a virtual cluster, which is advantageous to maintenance of the virtual cluster.

Figure 3:
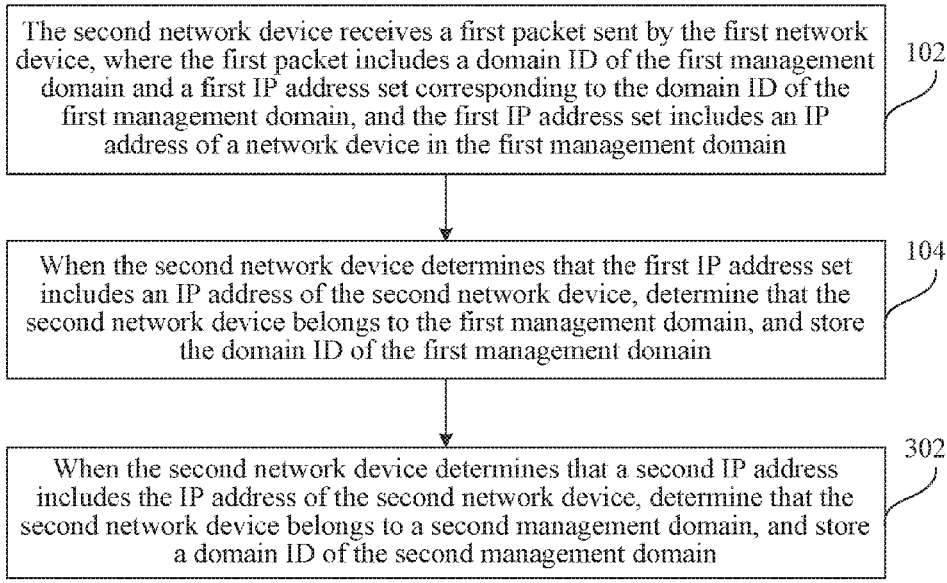
FIG. 3 is a schematic flowchart of a method for determining a management domain according to an embodiment of the present invention.

Optionally, referring to FIG. 3, the first network management device further manages a second management domain, the first packet further includes a domain ID of the second management domain and a second IP address set corresponding to the domain ID of the second management domain, the second IP address set includes an IP address of a network device in the second management domain, and the method further includes:

when the second network device determines that the second IP address set includes the IP address of the second network device, determining that the second network device belongs to the second management domain, and storing the domain ID of the second management domain.

Optionally, a third TLV may be extended in the first packet to carry the domain ID of the second management domain and the second IP address set corresponding to the domain ID of the second management domain. Optionally, when the first packet is the LSU packet, the third TLV is extended in the Opaque LSA of the LSU shown in FIG. 2A and FIG. 2B to carry the domain ID of the second management domain and the second IP address set corresponding to the domain ID of the second management domain. Alternatively, when the first packet is the LSP, the third TLV is extended in the Variable Length Fields of the LSP shown in FIG. 2D. A format of the third TLV is the same as that of the first TLV, and for details, refer to FIG. 2C, where:

a Type (Type) field with a length of 2 bytes is used to identify that the third TLV carries the domain ID of the second management domain and the second IP address set, where when the first packet is the LSU packet, a value of the Type field is a type value different from that of a TLV in an Opaque LSA in the prior art, and when the first packet is the LSP, a value of the Type field is a type value different from that of a TLV in an LSP in the prior art;

a Length (Length) field with a length of 2 bytes is used to identify a total length of data content included in the third TLV;

a Management Domain Identifier (ID) field with a length of 4 bytes is used to carry the domain ID of the second management domain;

an IP Address 1 field with a length of 4 bytes is used to carry the first IP address in the second IP address set;

an IP Address 2 field with a length of 4 bytes is used to carry the second IP address in the second IP address set;

. . .

an IP Address n field with a length of 4 bytes is used to identify the $n^{th}$ IP address (n is a natural number) in the second IP address set. FIG. 2C is merely an example, and there may be one or more IP address fields.

After receiving the first packet, and after parsing the third TLV, the second network device determines that the second IP address set carried in the third TLV includes the IP address of the second network device, and therefore determines that the second network device belongs to the second management domain.

It can be seen that, when the first network management device further manages a second management domain, the first packet may further include a domain ID of the second management domain and a second IP address set corresponding to the domain ID of the second management domain. In this case, after receiving the first packet, and when determining that the second IP address set includes the IP address of the second network device, the second network device determines that the second network device belongs to the second management domain. By using the solution of the embodiment shown in FIG. 3, when the first network device manages at least two management domains, managed network devices in different management domains managed by the first network device can determine, according to the first packet, management domains to which the network devices belong to, so that the number of times of packet interaction can be decreased, and occupation of network bandwidth in the virtual cluster is reduced.

Figure 4:
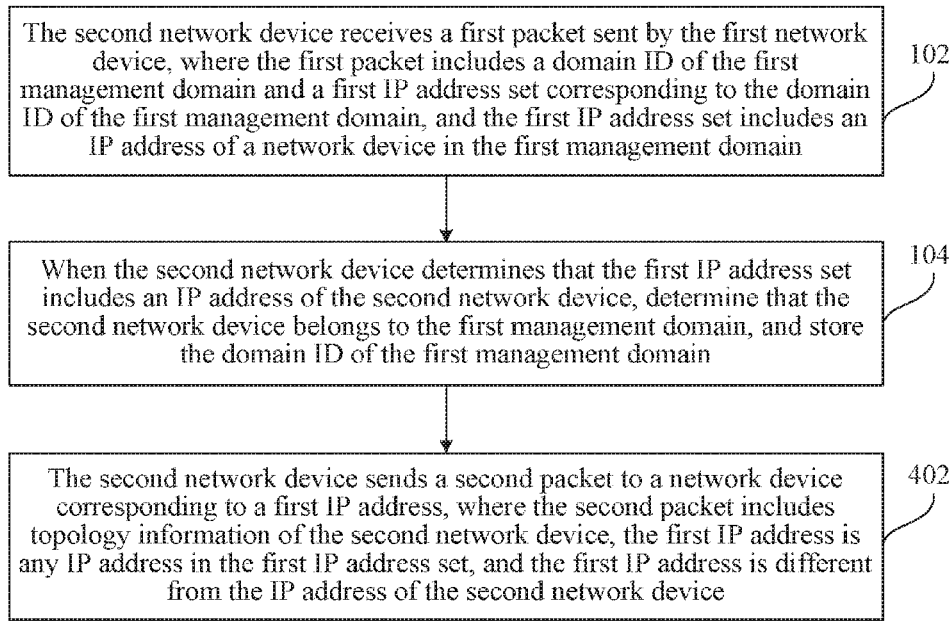
FIG. 4 is a schematic flowchart of a method for determining a management domain according to an embodiment of the present invention.

Optionally, referring to FIG. 4, after step 104, the method further includes:

402: The second network device sends a second packet to a network device corresponding to a first IP address, where the second packet includes topology information of the second network device, the first IP address is any IP address in the first IP address set, and the first IP address is different from the IP address of the second network device.

Optionally, after the second network device determines that the second network device belongs to the second management domain, the method further includes:

sending, by the second network device, the topology information of the second network device to a network device corresponding to a second IP address, where the second IP address is any IP address in the second IP address set, and the second IP address is different from the IP address of the second network device.

The topology information of the second network device that is included in the second packet includes: topology information received from another network device by the second network device, and topology information configured on the second network device. When the first IP address is an IP address of the first network device, after receiving the topology information of the second network device, the first network device stores the topology information of the second network device, and sends the topology information of the second network device to other management devices in the virtual cluster, so that each management device in the virtual cluster obtains the topology information of the second network device.

Optionally, when the network device corresponding to the first IP address is a network device in a management domain managed by the first network device, the second packet further includes the domain ID of the first management domain and an IP address of the first network device, so that after receiving the second packet, the network device corresponding to the first IP address determines whether the domain ID of the first management domain is the same as a domain ID of a management domain to which the network device corresponding to the first IP address belongs, and determines whether the IP address of the first network device is the same as an IP address of a management device in the management domain to which the network device corresponding to the first IP address belongs. If the domain ID of the first management domain is the same as the domain ID of the management domain to which the network device corresponding to the first IP address belongs, and the IP address of the first network device is the same as the IP address of the management device in the management domain to which the network device corresponding to the first IP address belongs, it is determined that the network device corresponding to the first IP address and the second network device belong to the same management domain, and further, the topology information of the second network device is saved. In this way, the network device corresponding to the first IP address may only save topology information sent by a network device that belongs to the same management domain as the network device corresponding to the first IP address, thereby reducing occupied memory of the network device corresponding to the first IP address.

Optionally, the second packet may be an LSU packet or an LSP.

Figure 5:
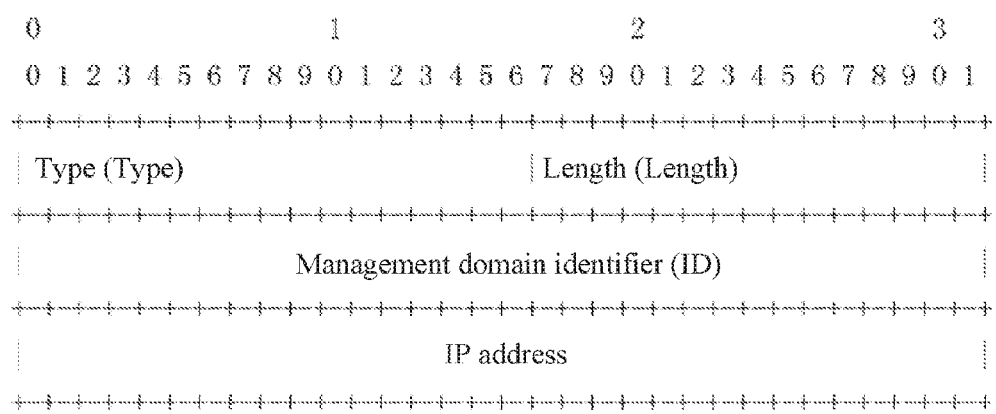
FIG. 5 is a schematic diagram of a format of a fourth TLV according to an embodiment of the present invention.

Optionally, when the network device corresponding to the first IP address is a network device in a management domain managed by the first network device, the domain ID of the first management domain and the IP address of the first network device may be carried in a fourth TLV extended in the second packet. When the second packet is an LSU packet, the fourth TLV is extended in the Opaque LSA of the LSU packet shown in FIG. 2A and FIG. 2B to carry the domain ID of the first management domain and the IP address of the first network device. Alternatively, when the second packet is an LSP, the fourth TLV is extended in the Variable Length Fields of the LSP in FIG. 2D, and a format of the fourth TLV is shown in FIG. 5, where:

a Type (Type) field with a length of 2 bytes is used to identify that the fourth TLV carries the domain ID of the first management domain and the IP address of the first network device;

a Length (Length) field with a length of 2 bytes is used to identify a total length of data content included in the fourth TLV;

a Management Domain Identifier (ID) field with a length of 4 bytes is used to identify the domain ID of the first management domain; and an IP Address field with a length of 4 bytes is used to identify the IP address of the first network device.

Figure 6:
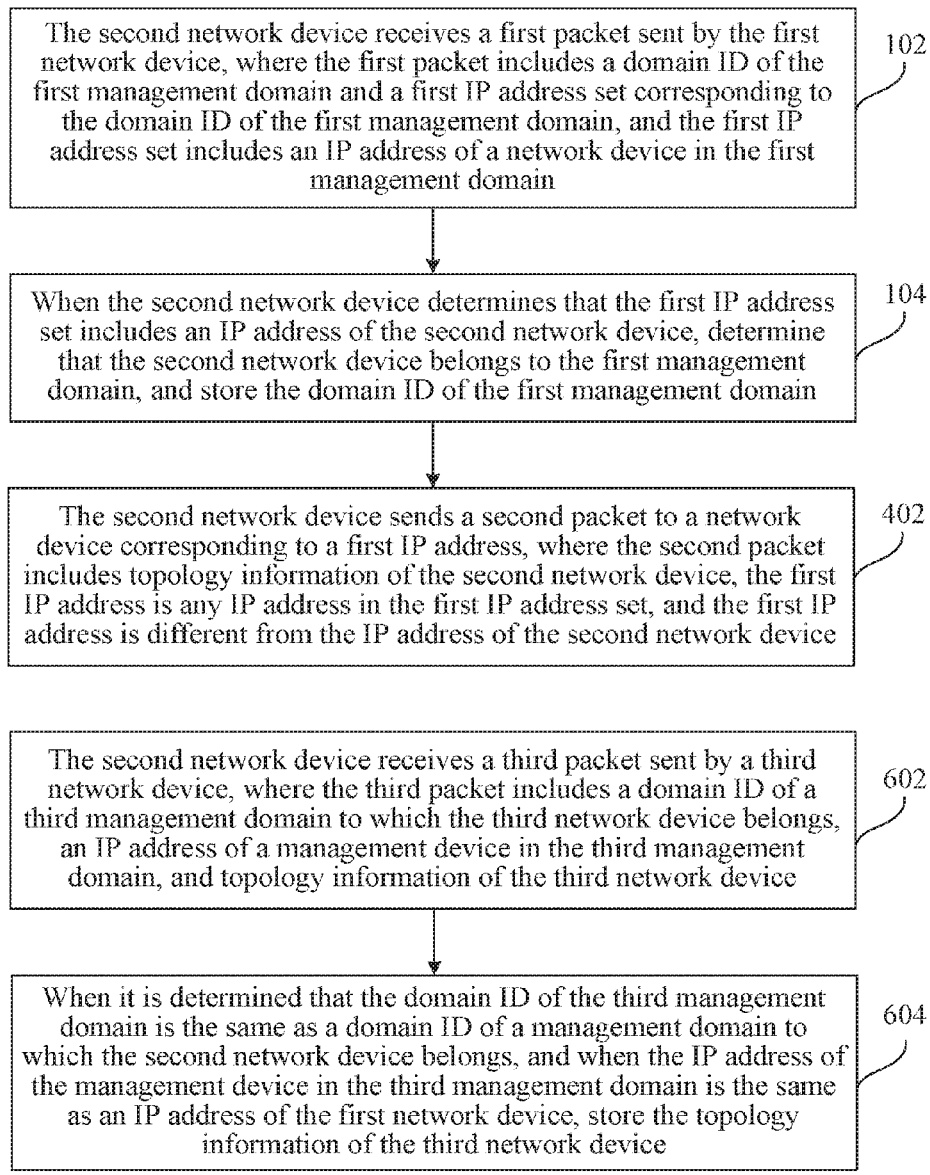
FIG. 6 is a schematic flowchart of a method for determining a management domain according to an embodiment of the present invention.

Optionally, referring to FIG. 6, the virtual cluster further includes a third network device, and after step 104, the method further includes:

602: The second network device receives a third packet sent by the third network device, where the third packet includes a domain ID of a third management domain to which the third network device belongs, an IP address of a management device in the third management domain, and topology information of the third network device.

604: When it is determined that the domain ID of the third management domain is the same as a domain ID of a management domain to which the second network device belongs, and when the IP address of the management device in the third management domain is the same as an IP address of the first network device, store the topology information of the third network device. When it is determined that the domain ID of the management domain to which the second network device belongs is different from the domain ID of the third management domain, and/or, the IP address of the first network device is different from the IP address of the management device in the third management domain, the operation of storing the topology information of the third network device is omitted.

Optionally, the third packet may be an LSU packet or an LSP, and a fifth TLV is extended in the Opaque LSA of the LSU packet shown in FIG. 2A and FIG. 2B to carry the domain ID of the third management domain and the IP address of the management device in the third management domain, or the fifth TLV is extended in the Variable Length Fields of the LSP shown in FIG. 2D to carry the domain ID of the third management domain and the IP address of the management device in the third management domain, where a format of the fifth TLV is the same as that of the fourth TLV. For details, refer to FIG. 5, and details are not described herein again.

Because in an existing network, a managed device in a virtual cluster usually uses a Layer 3 switch device with a small memory capacity, the second network device decides, by determining whether the second network device and the third network device belong to a same management domain, whether to save the topology information of the third network device. When the second network device and the third network device do not belong to a same management domain, the operation of storing the topology information of the third network device is omitted, which can prevent that a memory capacity of the second network device is occupied excessively.

Figure 7:
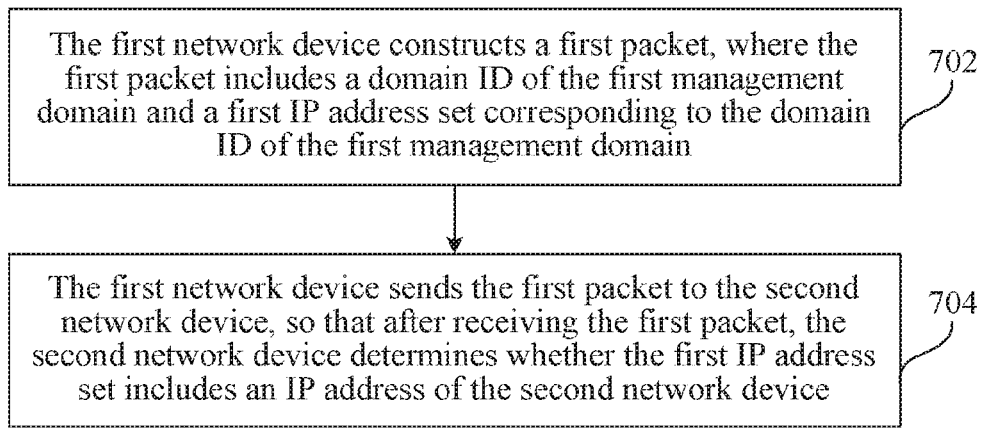
FIG. 7 is a schematic flowchart of a method for determining a management domain according to an embodiment of the present invention.

Referring to FIG. 7, an embodiment of the present invention further provides a method for determining a management domain, where the method is applicable to a virtual cluster, the virtual cluster includes a first network device and a second network device, the virtual cluster includes at least two management domains, the first network device manages a first management domain, and the method includes the following content:

702: The first network device constructs a first packet, where the first packet includes a domain ID of the first management domain and a first IP address set corresponding to the domain ID of the first management domain.

704: The first network device sends the first packet to the second network device, so that after receiving the first packet, the second network device determines whether the first IP address set includes an IP address of the second network device, and when the first IP address set includes the IP address of the second network device, determines that the second network device belongs to the first management domain, and stores the domain ID of the first management domain.

Optionally, the first packet may be an LSU packet or an LSP, an implementation solution of the first packet has been described when the first packet is mentioned in the foregoing embodiment, and is not described herein again.

Optionally, the first IP address set is pre-configured on the first network device by a network administrator.

It can be seen that, the first network device sends the first packet to the second network device, and after receiving the first packet, the second network device determines whether the first IP address set includes an IP address of the second network device. When the first IP address set includes the IP address of the second network device, it is determined that the second network device belongs to the first management domain. By using this solution, a management domain to which the second network device belongs can be determined easily and conveniently, without the need of manually configuring management domain information on the second network device. For example, when the first network device manages multiple network devices, it is unnecessary to manually configure management domain information separately on the multiple network devices managed by the first network device, thereby simplifying configuration of a virtual cluster, which is advantageous to maintenance of the virtual cluster.

Optionally, the first network management device further manages a second management domain, and the first packet further includes a domain ID of the second management domain and a second IP address set corresponding to the domain ID of the second management domain, so that after receiving the first packet, and when determining that the second IP address set includes the IP address of the second network device, the second network device determines that the second network device belongs to the second management domain, and stores the domain ID of the second management domain.

It can be seen that, when the first network management device further manages a second management domain, the first packet may further include a domain ID of the second management domain and a second IP address set corresponding to the domain ID of the second management domain, so that after receiving the first packet, and when determining that the second IP address set includes the IP address of the second network device, the second network device determines that the second network device belongs to the second management domain. When the first network device manages at least two management domains, managed network devices in different management domains managed by the first network device can determine, according to the first packet, management domains to which the network devices belong to, so that the number of times of packet interaction can be decreased, and occupation of network bandwidth in the virtual cluster is reduced.

Optionally, the domain ID of the second management domain and the second IP address set corresponding to the domain ID of the second management domain may be carried by using a third TLV in the first packet, where the third TLV has been described in the method for determining a management domain shown in FIG. 3, and is not described herein again.

Figure 8:
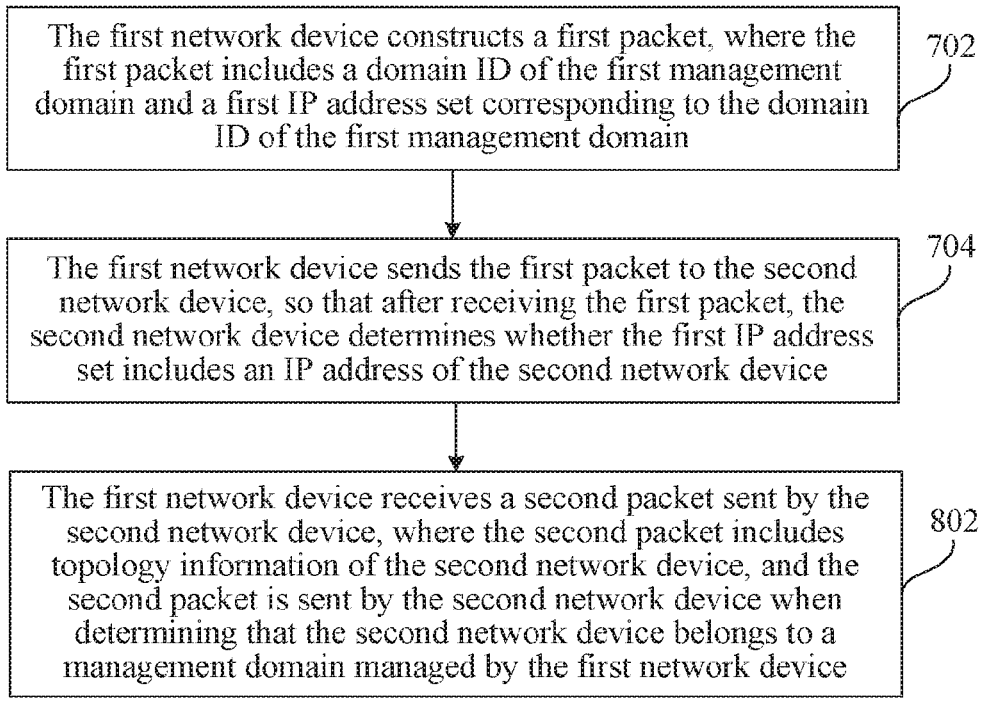
FIG. 8 is a schematic flowchart of a method for determining a management domain according to an embodiment of the present invention.

Optionally, referring to FIG. 8, the method further includes:

802: The first network device receives a second packet sent by the second network device, where the second packet includes topology information of the second network device, and the second packet is sent by the second network device when determining that the second network device belongs to a management domain managed by the first network device.

Optionally, the second packet may be an LSU packet or an LSP.

After receiving the topology information of the second network device, the first network device stores the topology information of the second network device, and sends the topology information of the second network device to other management devices in the virtual cluster, so that each management device in the virtual cluster obtains the topology information of the second network device.

Figure 9:
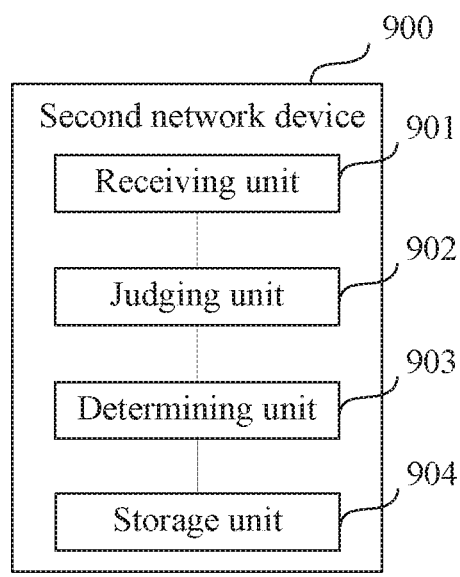
FIG. 9 is a schematic structural diagram of a second network device according to an embodiment of the present invention.

Referring to FIG. 9, an embodiment of the present invention provides a second network device 900, where the second network device 900 is applicable to a virtual cluster, the virtual cluster includes a first network device and the second network device 900, the virtual cluster includes at least two management domains, the first network device manages a first management domain, and the second network device 900 includes:

- a receiving unit 901, configured to receive a first packet sent by the first network device, where the first packet includes a domain identifier ID of the first management domain and a first Internet Protocol IP address set corresponding to the domain ID of the first management domain, and the first IP address set includes an IP address of a network device in the first management domain;
- a judging unit 902, configured to determine whether the first IP address set that is included in the first packet received by the receiving unit 901 includes an IP address of the second network device 900;
- a determining unit 903, configured to: when the judging unit 902 determines that the first IP address set includes the IP address of the second network device 900, determine that the second network device 900 belongs to the first management domain; and
- a storage unit 904, configured to store the domain ID of the first management domain when the determining unit 903 determines that the second network device 900 belongs to the first management domain.

Optionally, the first packet may be an LSU packet or an LSP, which has been described in the method for determining a management domain shown in FIG. 1, and is not described herein again.

Optionally, the first network management device further manages a second management domain, the first packet further includes a domain ID of the second management domain and a second IP address set corresponding to the domain ID of the second management domain, and the second IP address set includes an IP address of a network device in the second management domain;
the judging unit 902 is further configured to determine whether the second IP address set includes the IP address of the second network device 900;
the determining unit 903 is further configured to: when the judging unit 902 determines that the second IP address set includes the IP address of the second network device 900, determine that the second network device 900 belongs to the second management domain; and
the storage unit 904 is further configured to store the domain ID of the second management domain when the determining unit 903 determines that the second network device 900 belongs to the second management domain.

Optionally, the domain ID of the second management domain and the second IP address set corresponding to the domain ID of the second management domain may be carried by an extended third TLV in the first packet, the meaning of each field of the third TLV has been described in the method for determining a management domain shown in FIG. 3, and is not described herein again.

Optionally, the first network management device further manages a second management domain, the first packet further includes a domain ID of the second management domain and a second IP address set corresponding to the domain ID of the second management domain, and the second IP address set includes an IP address of a network device in the second management domain;
the judging unit 902 is further configured to determine whether the second IP address set includes the IP address of the second network device 900;
the determining unit 903 is further configured to: when the judging unit 902 determines that the second IP address set includes the IP address of the second network device 900, determine that the second network device 900 belongs to the second management domain; and
the storage unit 904 is further configured to store the domain ID of the second management domain when the determining unit 903 determines that the second network device 900 belongs to the second management domain.

Figure 10:
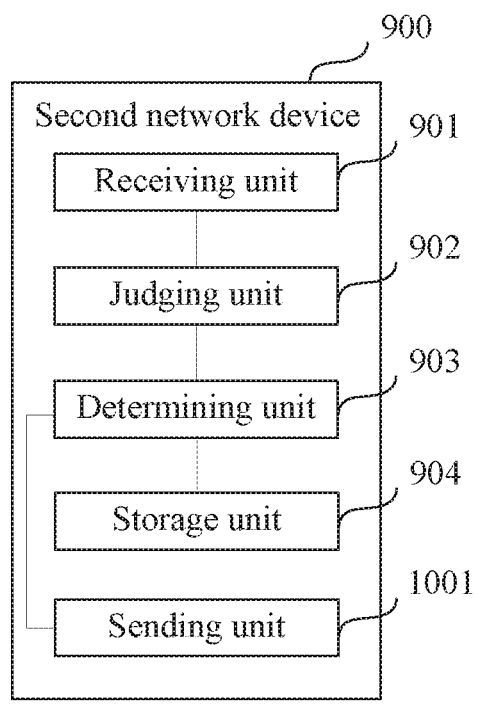
FIG. 10 is a schematic structural diagram of a second network device according to an embodiment of the present invention.

Optionally, referring to FIG. 10, the second network device 900 further includes:
a sending unit 1001, configured to: after the determining unit 903 determines that the second network device 900 belongs to the first management domain, send a second packet to a network device corresponding to a first IP address, where the second packet includes topology information of the second network device 900, the first IP address is any IP address in the first IP address set, and the first IP address is different from the IP address of the second network device 900.

Optionally, after the determining unit 903 determines that the second network device 900 belongs to the second management domain,
the sending unit 1001 is further configured to send the topology information of the second network device 900 to a network device corresponding to a second IP address, where the second IP address is any IP address in the second IP address set, and the second IP address is different from the IP address of the second network device 900.

The topology information of the second network device 900 that is included in the second packet includes: topology information received from another network device by the second network device 900, and topology information configured on the second network device 900.

Optionally, when the network device corresponding to the first IP address is a network device in a management domain managed by the first network device, the second packet further includes the domain ID of the first management domain and an IP address of the first network device, so that after receiving the second packet, the network device corresponding to the first IP address determines whether the domain ID of the first management domain is the same as a domain ID of a management domain to which the network device corresponding to the first IP address belongs, and determines whether the IP address of the first network device is the same as an IP address of a management device in the management domain to which the network device corresponding to the first IP address belongs. If the domain ID of the first management domain is the same as the domain ID of the management domain to which the network device corresponding to the first IP address belongs, and the IP address of the first network device is the same as the IP address of the management device in the management domain to which the network device corresponding to the first IP address belongs, it is determined that the network device corresponding to the first IP address and the second network device 900 belong to the same management domain, and further, the topology information of the second network device 900 is saved. In this way, the network device corresponding to the first IP address may only save topology information sent by a network device that belongs to the same management domain as the network device corresponding to the first IP address, thereby reducing occupied memory of the network device corresponding to the first IP address.

Optionally, the second packet may be an LSU packet or an LSP.

Optionally, when the network device corresponding to the first IP address is a network device in a management domain managed by the first network device, a fourth TLV may be extended in the second packet to carry the domain ID of the second management domain and the second IP address set corresponding to the domain ID of the second management domain, and the meaning of each field of the fourth TLV has been described in the method for determining a management domain shown in FIG. 4, and is not described herein again.

Optionally, the virtual cluster further includes a third network device;
the receiving unit 901 is further configured to receive a third packet sent by the third network device, where the third packet includes a domain ID of a third management domain to which the third network device belongs, an IP address of a management device in the third management domain, and topology information of the third network device;
the judging unit 902 is further configured to determine whether the domain ID of the third management domain is the same as a domain ID that is stored by the storage unit 904 and is of a management domain to which the second network device 900 belongs, and determine whether the IP address of the management device in the third management domain is the same as an IP address of the first network device; and
the storage unit 904 is further configured to: when the judging unit 902 determines that the domain ID of the third management domain is the same as the domain ID that is stored by the storage unit 904 and is of the management domain to which the second network device 900 belongs, and when the IP address of the management device in the third management domain is the same as the IP address of the first network device, store the topology information of the third network device.

Optionally, the third packet may be an LSU packet or an LSP, the domain ID of the third management domain and the IP address of the management device in the third management domain are carried by a fifth TLV extended in the third packet. For details about the fifth TLV, refer to FIG. 5, and details are not described herein again.

Optionally, the second network device 900 may be a router or a switch.

Optionally, the receiving unit 901, the judging unit 902, the determining unit 903, the storage unit 904 and the sending unit 1001 may be combined into one or more units.

Figure 11:
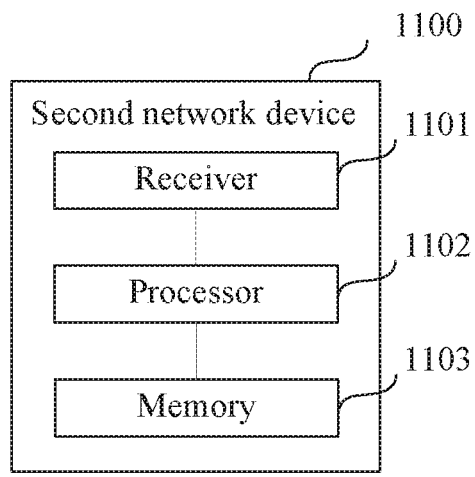
FIG. 11 is a schematic structural diagram of a second network device according to an embodiment of the present invention.

Referring to FIG. 11, an embodiment of the present invention provides a second network device 1100, where the second network device 1100 is applicable to a virtual cluster, the virtual cluster includes a first network device and the second network device 1100, the virtual cluster includes at least two management domains, the first network device manages a first management domain, and the second network device 1100 includes:
- a receiver 1101, configured to receive a first packet sent by the first network device, where the first packet includes a domain ID of the first management domain and a first IP address set corresponding to the domain ID of the first management domain, and the first IP address set includes an IP address of a network device in the first management domain;
- a processor 1102, configured to determine whether the first IP address set that is included in the first packet received by the receiver 1101 includes an IP address of the second network device 1100, and when determining that the first IP address set includes the IP address of the second network device 1100, determine that the second network device 1100 belongs to the first management domain; and
- a memory 1103, configured to store the domain ID of the first management domain when the processor 1102 determines that the second network device 1100 belongs to the first management domain.

Optionally, the first network management device further manages a second management domain, the first packet further includes a domain ID of the second management domain and a second IP address set corresponding to the domain ID of the second management domain, and the second IP address set includes an IP address of a network device in the second management domain, where
  the processor 1102 is further configured to determine whether the second IP address set includes the IP address of the second network device 1100, and when determining that the second IP address set includes the IP address of the second network device 1100, determine that the second network device 1100 belongs to the second management domain; and
  the memory 1103 is further configured to store the domain ID of the second management domain when the processor 1102 determines that the second network device 1100 belongs to the second management domain.

Figure 12:
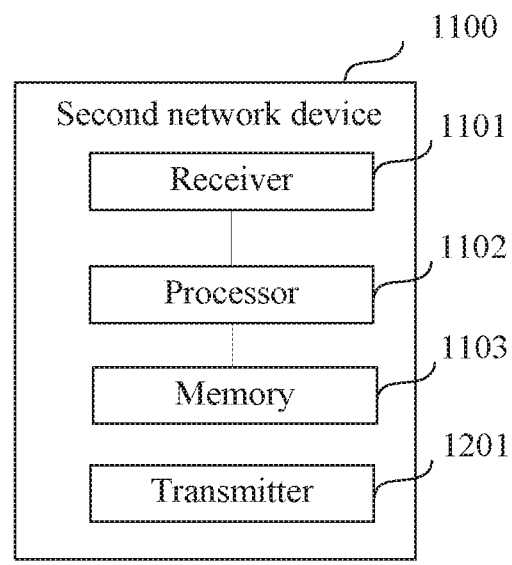
FIG. 12 is a schematic structural diagram of a second network device according to an embodiment of the present invention.

Optionally, referring to FIG. 12, the second network device 1100 further includes:
  a transmitter 1201, configured to: after the processor 1102 determines that the second network device 1100 belongs to the first management domain, send a second packet to a network device corresponding to a first IP address, where the second packet includes topology information of the second network device 1100, the first IP address is any IP address in the first IP address set, and the first IP address is different from the IP address of the second network device 1100.

Optionally, the transmitter 1201 is further configured to: after the processor 1102 determines that the second network device 1100 belongs to the second management domain, send topology information of the second network device 1100 to a network device corresponding to a second IP address, where the second IP address is any IP address in the second IP address set, and the second IP address is different from the IP address of the second network device 1100.

Optionally, the second packet may be an LSU packet or an LSP.

Optionally, the virtual cluster further includes a third network device;
  the receiver 1101 is further configured to receive a third packet sent by the third network device, where the third packet includes a domain ID of a third management domain to which the third network device belongs, an IP address of a management device in the third management domain, and topology information of the third network device;
  the processor 1102 is further configured to determine whether the domain ID of the third management domain is the same as a domain ID that is stored by the memory 1103 and is of a management domain to which the second network device 1100 belongs, and determine whether the IP address of the management device in the third management domain is the same as an IP address of the first network device; and
  the memory 1103 is further configured to: when the processor 1102 determines that the domain ID of the third management domain is the same as the domain ID that is stored by the memory 1103 and is of the management domain to which the second network device 1100 belongs, and when the IP address of the management device in the third management domain is the same as the IP address of the first network device, store the topology information of the third network device.

Optionally, the third packet may be an LSU packet or an LSP, and a fifth TLV is extended in the Opaque LSA of the LSU packet shown in FIG. 2A and FIG. 2B to carry the domain ID of the third management domain and the IP address of the management device in the third management domain, or the fifth TLV is extended in the Variable Length Fields of the LSP shown in FIG. 2D to carry the domain ID of the third management domain and the IP address of the management device in the third management domain, where a format of the fifth TLV is the same as that of the fourth TLV. For details, refer to FIG. 5, and details are not described herein again.

The second network device 1100 may be a router or a switch.

Optionally, the processor 1102 may be a central processing unit (Central Processing Unit, CPU), the memory 1103 may be an internal memory of a random access memory (Random Access Memory, RAM) type, the receiver 1101 and the transmitter 1201 may include a common physical interface, and the physical interface may be an Ethernet (Ethernet) interface or an asynchronous transfer mode (Asynchronous Transfer Mode, ATM) interface. The processor 1102, the receiver 1101, the transmitter 1201, and the memory 1103 may be integrated into one or more independent circuits or hardware, for example, an application specific integrated circuit (Application Specific Integrated Circuit, ASIC).

Figure 13:
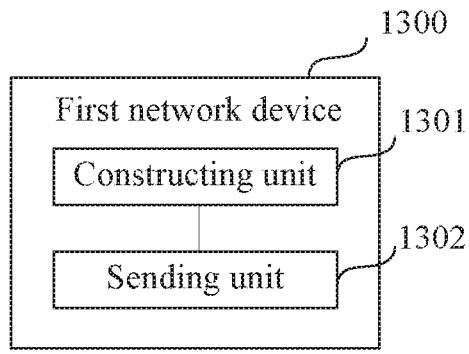
FIG. 13 is a schematic structural diagram of a first network device according to an embodiment of the present invention.

Referring to FIG. 13, an embodiment of the present invention provides a first network device 1300, where the first network device 1300 is a network device in a virtual cluster, the virtual cluster includes the first network device 1300 and a second network device, the virtual cluster includes at least two management domains, the first network device 1300 manages a first management domain, and the first network device 1300 includes:

a constructing unit 1301, configured to construct a first packet, where the first packet includes a domain ID of the first management domain and a first IP address set corresponding to the domain ID of the first management domain; and a sending unit 1302, configured to send the first packet constructed by the constructing unit 1301 to the second network device, so that after receiving the first packet, and when determining that the first IP address set includes an IP address of the second network device, the second network device determines that the second network device belongs to the first management domain, and stores the domain ID of the first management domain.

Optionally, the first packet may be an LSU packet or an LSP, and an implementation solution of the first packet has been described in the method for determining a management domain shown in FIG. 1, and is not described herein again.

Optionally, the first IP address set is pre-configured on the first network device 1300 by a network administrator.

Figure 14:
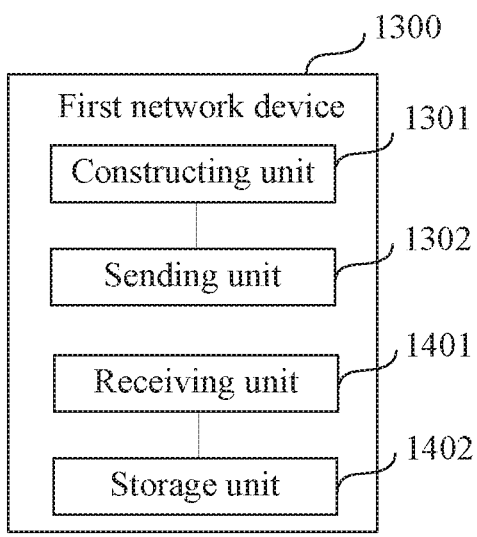
FIG. 14 is a schematic structural diagram of a first network device according to an embodiment of the present invention.

Optionally, referring to FIG. 14, the first network device 1300 further includes:

a receiving unit 1401, configured to receive a second packet sent by the second network device, where the second packet includes topology information of the second network device, and the second packet is sent by the second network device when determining that the second network device belongs to a management domain managed by the first network device 1300; and a storage unit 1402, configured to store the topology information of the second network device that is received by the receiving unit 1401.

After receiving the topology information of the second network device, the first network device 1300 stores the topology information of the second network device, and sends the topology information of the second network device to other management devices in the virtual cluster, so that each management device in the virtual cluster obtains the topology information of the second network device.

Optionally, the second packet may be an LSU packet or an LSP. The topology information of the second network device that is included in the second packet includes: topology information received from another network device by the second network device, and topology information configured on the second network device.

Optionally, the sending unit 1302 is further configured to send the topology information of the second network device to other management devices in the virtual cluster, so that each management device in the virtual cluster obtains the topology information of the second network device.

Optionally, the first network device 1300 may be a router or a switch.

Optionally, the constructing unit 1301, the sending unit 1302, the receiving unit 1401, and the storage unit 1402 may be combined into one or more units.

Figure 15:
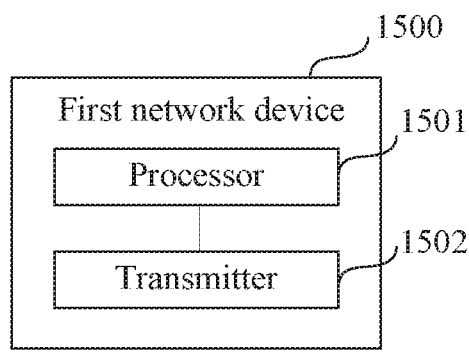
FIG. 15 is a schematic structural diagram of a first network device according to an embodiment of the present invention.

Referring to FIG. 15, an embodiment of the present invention provides a first network device 1500, where the first network device 1500 is a network device in a virtual cluster, the virtual cluster includes the first network device 1500 and a second network device, the virtual cluster includes at least two management domains, the first network device 1500 manages a first management domain, and the first network device 1500 includes:

a processor 1501, configured to construct a first packet, where the first packet includes a domain ID of the first management domain and a first IP address set corresponding to the domain ID of the first management domain; and a transmitter 1502, configured to send the first packet constructed by the processor 1501 to the second network device, so that after receiving the first packet, and when determining that the first IP address set includes an IP address of the second network device, the second network device determines that the second network device belongs to the first management domain, and stores the domain ID of the first management domain.

Optionally, the first IP address set is pre-configured on the first network device 1500 by a network administrator.

Figure 16:
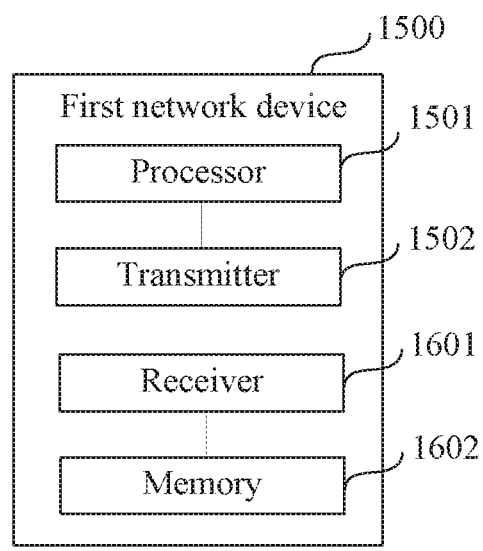
FIG. 16 is a schematic structural diagram of a first network device according to an embodiment of the present invention.

Optionally, referring to FIG. 16, the first network device 1500 further includes:

a receiver 1601, configured to receive a second packet sent by the second network device, where the second packet includes topology information of the second network device, and the second packet is sent by the second network device when determining that the second network device belongs to a management domain managed by the first network device 1500; and a memory 1602, configured to store the topology information of the second network device that is received by the receiver 1601.

After receiving the topology information of the second network device, the first network device 1500 stores the topology information of the second network device, and sends the topology information of the second network device to other management devices in the virtual cluster, so that each management device in the virtual cluster obtains the topology information of the second network device.

Optionally, the second packet may be an LSU packet or an LSP. The topology information of the second network device that is included in the second packet includes: topology information received from another network device by the second network device, and topology information configured on the second network device.

Optionally, the transmitter 1601 is further configured to send the topology information of the second network device to other management devices in the virtual cluster, so that each management device in the virtual cluster obtains the topology information of the second network device.

The first network device 1500 may be a router or a switch.

Optionally, the processor 1501 may be a CPU, the transmitter 1601 and the receiver 1502 may include a common physical interface, and the physical interface may be an Ethernet interface or an ATM interface. The processor 1501, the transmitter 1601, and the receiver 1502 may be integrated into one or more independent circuits or hardware, for example, an ASIC.

Figure 17:
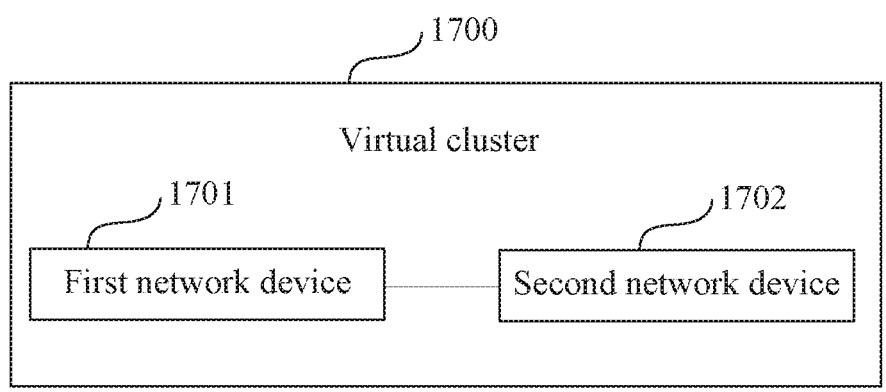
FIG. 17 is a simplified schematic structural diagram of a virtual cluster according to an embodiment of the present invention.

Referring to FIG. 17, a virtual cluster 1700 is further provided, where the virtual cluster 1700 includes a first network device 1701 and a second network device 1702, the virtual cluster 1700 includes at least two management domains, and the first network device 1701 manages a first management domain, where:

the first network device 1701 is configured to construct a first packet, and send the first packet to the second network device 1702, where the first packet includes a domain ID of the first management domain and a first IP address set corresponding to the domain ID of the first management domain, and the first IP address set includes an IP address of a network device in the first management domain; and the second network device 1702 is configured to receive the first packet, and when determining that the first IP address set includes an IP address of the second network device 1702, determine that the second network device 1702 belongs to the first management domain, and store the domain ID of the first management domain.

Optionally, the first packet is a link state update LSU packet, and a first TLV is added to an opaque link state advertise Opaque LSA of the LSU packet to carry the domain ID of the first management domain and the first IP address set, or the first packet may be an LSP, and a second TLV is added to the LSP to carry the domain ID of the first management domain and the first IP address set; an implementation solution of the first packet has been described when the first packet is mentioned in the foregoing embodiments, and is not described herein again.

Optionally, the first network device 1701 may be the first network device 1300 shown in FIG. 13, the first network device 1300 shown in FIG. 14, the first network device 1500 shown in FIG. 15, or the first network device 1500 shown in FIG. 16.

Optionally, the second network device 1702 may be the second network device 900 shown in FIG. 9, the second network device 900 shown in FIG. 10, the second network device 1100 shown in FIG. 11, or the second network device 1100 shown in FIG. 12.

"First" in the first network device, the first packet, the first management domain, and the first TLV that are mentioned in the embodiments of the present invention is only used as a name for identification, but does not represent the first place in sequence. This rule is also applicable to "second", "third", and "fourth".

It may be understood by persons of ordinary in the art that all or a part of the steps of the foregoing method embodiments may be implemented by a program instruction-related hardware, and the foregoing program may be stored in a computer readable storage medium. When the program runs, the steps of the foregoing method embodiment are performed. The foregoing medium includes any medium that can store program code, such as a read-only memory (Read-Only Memory, ROM for short), a RAM, a magnetic disk, or an optical disc.

Finally, it should be noted that the foregoing embodiments are merely intended for exemplarily describing the technical solutions of the present invention rather than limiting the present invention. Although the present invention and beneficial effects of the present invention are described in detail with reference to the foregoing embodiments, persons of ordinary skill in the art should understand that they may still make modifications to the technical solutions recorded in the foregoing embodiments or make equivalent replacements to some technical features thereof, as long as such modifications or replacements do not cause the essence of corresponding technical solutions to depart from the scope of the claims of the present invention.

What is claimed is:

1. A method for determining a management domain, wherein the method is applicable to a virtual cluster, the virtual cluster comprises a first network device, a second network device, and at least two management domains, wherein the first network device manages a first management domain, the method comprising:

receiving, by the second network device, a first packet sent by the first network device, wherein the first packet comprises a domain identifier (ID) of the first management domain and a first Internet Protocol (IP) address set corresponding to the domain ID of the first management domain, and the first IP address set comprises an IP address of a network device in the first management domain; and when the second network device determines that the first IP address set comprises an IP address of the second network device, determining that the second network device belongs to the first management domain, and storing the domain ID of the first management domain;

wherein after the second network device determines that the second network device belongs to the first management domain, the method further comprises:

sending, by the second network device, a second packet to the first network device, wherein the second packet comprises topology information of the second network device, wherein after receiving the topology information of the second network device, the first network device stores the topology information of the second network device, and sends the topology information of the second network device to other management devices in the virtual cluster.

2. The method according to claim 1, wherein the first network management device further manages a second management domain, the first packet further comprises a domain ID of the second management domain and a second IP address set corresponding to the domain ID of the second management domain, the second IP address set comprises an IP address of a network device in the second management domain, and the method further comprises:

when the second network device determines that the second IP address set comprises the IP address of the second network device, determining that the second network device belongs to the second management domain; and storing the domain ID of the second management domain.

3. The method according to claim 1, wherein the virtual cluster further comprises a third network device, and the method further comprises:

receiving, by the second network device, a third packet sent by the third network device, wherein the third packet comprises a domain ID of a third management domain to which the third network device belongs, an IP address of a management device in the third management domain, and topology information of the third network device; and when it is determined that the domain ID of the third management domain is the same as a domain ID of a management domain to which the second network device belongs, and when the IP address of the management device in the third management domain is the same as an IP address of the first network device, storing the topology information of the third network device.

4. The method according to claim 1, wherein:

the first packet is a link state update (LSU) packet, and a first type-length-value (TLV) is added to an opaque link state advertise (LSA) of the LSU packet to carry the domain ID of the first management domain and the first IP address set; or the first packet is a link state protocol (LSP) data unit, and a second TLV is added to the LSP data unit to carry the domain ID of the first management domain and the first IP address set.

5. A method for determining a management domain, wherein the method is applicable to a virtual cluster, the virtual cluster comprising a first network device, a second network device, and at least two management domains, wherein the first network device manages a first management domain, the method comprising:
constructing, by the first network device, a first packet comprising a domain identifier (ID) of the first management domain and a first Internet Protocol (IP) address set corresponding to the domain ID of the first management domain, and the first IP address set comprises an IP address of a network device in the first management domain;
sending, by the first network device, the first packet to the second network device, so that after receiving the first packet, the second network device determines whether the first IP address set comprises an IP address of the second network device, and when the first IP address set comprises the IP address of the second network device, determines that the second network device belongs to the first management domain, and stores the domain ID of the first management domain;
receiving, by the first network device, a second packet sent by the second network device, wherein the second packet comprises topology information of the second network device, and the second packet is sent by the second network device when it is determined that the second network device belongs to a management domain managed by the first network device;
storing, by the first network device, the topology information of the second network device; and
sending the topology information of the second network device to other management devices in the virtual cluster.

6. The method according to claim 5, wherein the first network management device further manages a second management domain, and the first packet further comprises a domain ID of the second management domain and a second IP address set corresponding to the domain ID of the second management domain, so that after receiving the first packet, and when it is determined that the second IP address set comprises the IP address of the second network device, the second network device determines that the second network device belongs to the second management domain, and stores the domain ID of the second management domain.

7. A second network device, wherein the second network device is a network device in a virtual cluster, the virtual cluster comprising a first network device, the second network device, and at least two management domains, wherein the first network device manages a first management domain, the second network device comprising:
a receiver, configured to receive a first packet sent by the first network device, wherein the first packet comprises a domain identifier (ID) of the first management domain and a first Internet Protocol (IP) address set corresponding to the domain ID of the first management domain, and the first IP address set comprises an IP address of a network device in the first management domain;
a processor, configured to determine whether the first IP address set that is comprised in the first packet received by the receiver comprises an IP address of the second network device, when determining that the first IP address set comprises the IP address of the second network device, to determine that the second network device belongs to the first management domain;
a memory, configured to store the domain ID of the first management domain when the processor determines that the second network device belongs to the first management domain; and
a transmitter configured to:
after the processor determines that the second network device belongs to the first management domain, send a second packet to the first network device, wherein the second packet comprises topology information of the second network device, wherein after receiving the topology information of the second network device, the first network device stores the topology information of the second network device, and sends the topology information of the second network device to other management devices in the virtual cluster.

8. The second network device according to claim 7, wherein:
the first network management device further manages a second management domain, and the first packet further comprises a domain ID of the second management domain and a second IP address set corresponding to the domain ID of the second management domain, and the second IP address set comprises an IP address of a network device in the second management domain;
the processor is further configured to:
in response to determining that the second IP address set comprises the IP address of the second network device, determine that the second network device belongs to the second management domain; and
the memory is further configured to store the domain ID of the second management domain when the processor determines that the second network device belongs to the second management domain.

9. The second network device according to claim 7, wherein:
the virtual cluster further comprises a third network device;
the receiver is further configured to receive a third packet sent by the third network device, wherein the third packet comprises a domain ID of a third management domain to which the third network device belongs, an IP address of a management device in the third management domain, and topology information of the third network device;
the processor is further configured to determine whether the domain ID of the third management domain is the same as a domain ID that is stored by the memory and is of a management domain to which the second network device belongs, and determine whether the IP address of the management device in the third management domain is the same as an IP address of the first network device; and
the memory is further configured to: when the processor determines that the domain ID of the third management domain is the same as the domain ID that is stored by the memory and is of the management domain to which the second network device belongs, and when the IP address of the management device in the third management domain is the same as the IP address of the first network device, store the topology information of the third network device.

10. A first network device, wherein the first network device is a network device in a virtual cluster, the virtual cluster comprising the first network device, a second network device, and at least two management domains, wherein the first network device manages a first management domain, the first network device comprising:
- a processor, configured to construct a first packet, wherein the first packet comprises a domain identifier (ID) of the first management domain and a first Internet Protocol (IP) address set corresponding to the domain ID of the first management domain, and the first IP address set comprises an IP address of a network device in the first management domain;
- a transmitter, configured to send the first packet constructed by the processor to the second network device, so that after receiving the first packet, and when determining that the first IP address set comprises an IP address of the second network device, the second network device determines that the second network device belongs to the first management domain, and stores the domain ID of the first management domain;
- a receiver, configured to receive a second packet sent by the second network device, wherein the second packet comprises topology information of the second network device, and the second packet is sent by the second network device when determining that the second network device belongs to a management domain managed by the first network device
- a memory, configured to store the topology information of the second network device; and
- the transmitter further configured to send the topology information of the second network device to other management devices in the virtual cluster.

11. A system, comprising:
a first network device and a second network device, wherein:
- the first network device manages a first management domain;
- the first network device is configured to construct a first packet, and send the first packet to the second network device, wherein the first packet comprises a domain identifier (ID) of the first management domain and a first Internet Protocol (IP) address set corresponding to the domain ID of the first management domain, and the first IP address set comprises an IP address of a network device in the first management domain;
- the second network device is configured to receive the first packet, and when it is determined that the first IP address set comprises an IP address of the second network device, determine that the second network device belongs to the first management domain, and store the domain ID of the first management domain, wherein the second network device is further configured to send, after the second network device determines that the second network device belongs to the first management domain, a second packet to the first network device, wherein the second packet comprises topology information of the second network device;
- the first network device is further configured to, after receiving the topology information of the second network device, store the topology information of the second network device, and send the topology information of the second network device to other management devices in the virtual cluster.

12. The system according to claim 11, wherein:
the first packet is a link state update (LSU) packet, and a first type-length-value (TLV) is added to an opaque link state advertise (LSA) of the LSU packet to carry the domain ID of the first management domain and the first IP address set; or
the first packet may be a link state protocol (LSP) data unit, and a second TLV is added to the LSP data unit to carry the domain ID of the first management domain and the first IP address set.

13. A non-transitory computer readable medium including computer executable instructions that, when executed by a system, cause the system to:
- receive a first packet sent by a first network device, wherein the first packet comprises a domain identifier (ID) of a first management domain and a first Internet Protocol (IP) address set corresponding to the domain ID of the first management domain, and the first IP address set comprises an IP address of a network device in the first management domain;
- determine whether the first IP address set that is comprised in the first packet received comprises an IP address of a second network device;
- when it is determined that the first IP address set comprises the IP address of the second network device, determine that the second network device belongs to the first management domain;
- store the domain ID of the first management domain, when the second network device is determined to belong to the first management domain; and
- send a second packet to the first network device, wherein the second packet comprises topology information of the second network device, wherein after receiving the topology information of the second network device, the first network device stores the topology information of the second network device, and sends the topology information of the second network device to other management devices in the virtual cluster.

14. A non-transitory computer readable medium including computer executable instructions that, when executed by a system, cause the system to:
- construct a first packet, wherein the first packet comprises a domain identifier (ID) of a first management domain and a first Internet Protocol (IP) address set corresponding to the domain ID of the first management domain, and the first IP address set comprises an IP address of a first network device in the first management domain;
- send the first packet constructed to a second network device, so that after receiving the first packet, and when determining that the first IP address set comprises an IP address of the second network device, the second network device determines that the second network device belongs to the first management domain, and stores the domain ID of the first management domain;
- receive a second packet sent by the second network device, wherein the second packet comprises topology information of the second network device, and the second packet is sent by the second network device when it is determined that the second network device belongs to a management domain managed by the first network device;
- store, by the first network device, the topology information of the second network device, and
- send the topology information of the second network device to other management devices in the virtual cluster.

* * * * *